United States Patent [19]

Mayr et al.

[11] 4,096,350

[45] Jun. 20, 1978

[54] CONNECTION STRUCTURE FOR COAXIAL CABLE

[75] Inventors: Ernst Mayr, Starnberg; Egid Kraus, Deisenhofen, both of Germany

[73] Assignee: Siemens Aktiengesellschaft, Berlin & Munich, Germany

[21] Appl. No.: 781,285

[22] Filed: Mar. 25, 1977

[30] Foreign Application Priority Data

Jan. 27, 1977  Germany .............................. 2703406

[51] Int. Cl.² .......................................... H02G 15/08
[52] U.S. Cl. ..................................... 174/88 C; 174/92
[58] Field of Search .................. 339/177 R, 177 E; 174/75 C, 88 C, 89, 92

[56] References Cited

U.S. PATENT DOCUMENTS

| | | | |
|---|---|---|---|
| 2,133,448 | 10/1938 | Harley | 174/88 C |
| 2,576,528 | 11/1951 | Matthysse | 339/278 C |
| 3,787,607 | 1/1974 | Schlafly | 174/88 C |
| 3,818,123 | 6/1974 | Maltz et al. | 174/88 C |
| 3,872,237 | 3/1975 | Eyre et al. | 174/88 C |

*Primary Examiner*—Neil Abrams
*Attorney, Agent, or Firm*—Hill, Gross, Simpson, Van Santen, Steadman, Chiara & Simpson

[57] ABSTRACT

A connective structure for joining coaxial cables in which the ends of the cable inner conductors which are to be connected together are provided with threading for screwing-on connective sleeves having a mating inner threading.

5 Claims, 7 Drawing Figures

CONNECTION STRUCTURE FOR COAXIAL CABLE

BACKGROUND OF THE INVENTION

The present invention lies in the field of coaxial cable splicing. With the development of cable types which contain a plurality of coaxial lines, a series of performance demands has been placed on the structure of splices for coaxial lines, for examples, a demand for low reflectivity, a demand for mechanical and electrical constancy of the connection, and the like. In known connection arrangements, the inner conductors are preferably connected by means of a soldering sleeve, while the outer conductors are generally bridged by means of a clamp connection. As a consequence of the thermal sensitivity of coaxial cables, however, a solder connection of inner conductors and/or outer conductors necessitates a relatively great splice length, and thus a correspondingly great construction length, for the cable sleeves in which the splices are to be accommodated In order to minimize the thermal stresses on coaxial lines in splicing operations, only the interior conductors were therefore soldered together, while the outer conductor connection was generally produced solder-free.

In the German Pat. No. 1,055,637 a connective arrangement for coaxial lines is described, in which shell-shaped clamping jaws, or jaws constructed with a longitudinal slot, and arranged over the spliced inner conductors, are mechanically clamped, by means of claw clamps, to the supporting-pipe-containing ends of the coaxial outer conductors to be connected. From German Pat. No. 752,378, it is known that tension-proof, solder-free conductor connections can be produced in those cylindrical connective sleeves where interior threadings are used, which are screwed onto the conductor ends. Further, for the connection of coaxial cables, the proposal is made in German Pat. No. 824,506 to connect the inner conductors by means of a connective bolt with, respectively, a right and a left thread, which bolt is screwed into the ends of the two inner conductors, such inner conductors being provided with corresponding threading.

BRIEF SUMMARY OF THE INVENTION

In the inventive connective arrangement, the threaded ends of the inner conductors of a pair of coaxial cables being interconnected to each other are connected together by means of a connective sleeve constructed as a threaded sleeve.

A principal object of this invention concerns the creating of a connection of the ends of coaxial conductors, which can be produced in the smallest possible space without the introduction of heat. Preferably, conventional connective sleeves, such as are known, for example, under the designation thermoplastic clamping sleeves, are to be usable for the accommodation of the coaxial splice connections.

Another object is to provide connective arrangements wherein the associated, necessary expenditure in terms of tools and material necessary for the execution of splicing operations is as small as possible. Also, and especially, a separation and reconstruction of the whole connection is to be possible without material loss.

These and other objects are accomplished in that the end of the inner conductor of at least one coaxial line is provided with a threading of such an axial length that this length corresponds at least to the axial length of the connective sleeve. Advantageously, the outer conductors, which are to be electrically connected together, are preferably bridged by means of hemi-cylindrical shells which are pressed onto the outer conductors by means of hose-clamp-like clamping means. At the junction points between the outer conductor parts, and also in the thread grooves of the inner conductor connection, it is advantageously possible to introduce conductive silver, conductive lacquer, or the like. The threaded inner conductor sections can, in particular, be made use of for compensation of irregularities, if necessary or desirable, by corresponding dimensioning.

Other and further objects, aims, purposes, features, achievements, advantages, utilities and the like will be apparent to those skilled in the art from the accompanying specification taken with the drawings.

DETAILED DESCRIPTION

Figure 1:
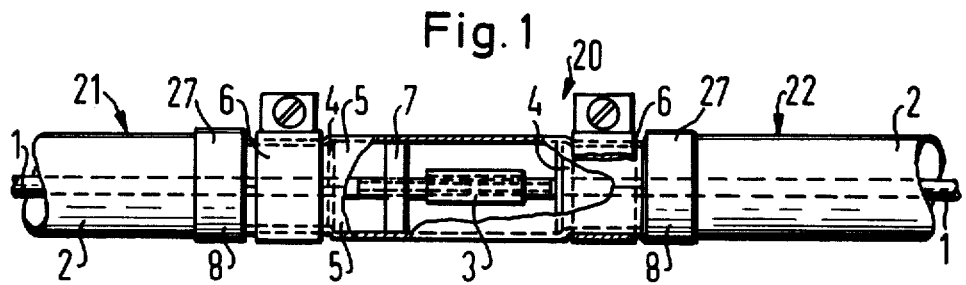
FIG. 1 is a side elevational view of one embodiment of the present invention, some parts thereof broken and some parts shown in section.
Figure 1A:
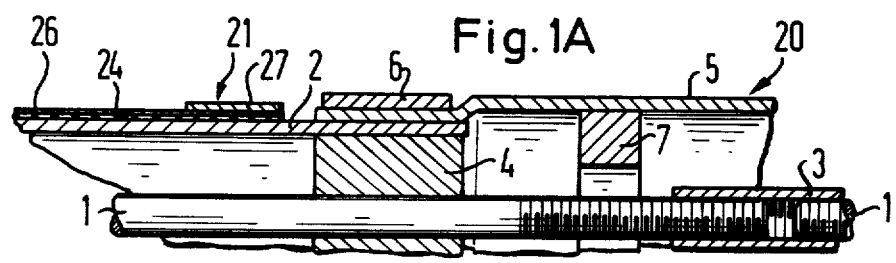
FIG. 1A is a fragmentary enlarged vertical sectional view of a portion of the splice region of the embodiment of FIG. 1.

Referring to FIGS. 1 and 1A there is seen one embodiment of a connection structure the present invention which is designated in its entirety by the numeral 20. Connection structure 20 interconnects two coaxial cables 21 and 22. Cables 21 and 22 are here similar to one another in construction and each has an inner conductor 1 and an outer conductor 2. Paper band layers 24 on outer conductors 2 may each surrounded by respective steel band layers 26. Other cable protective overlayments may be employed if desired.

Each of the inner conductors 1 is threaded in regions thereof adjacent the respective ends thereof. Inner conductor 1 of cable 1 is thus threaded over a sufficient axial length thereof to permit an inwardly matingly threaded sleeve 3 to be substantially completely screwed onto such adjacent the end thereof. In most cases, it then suffices if the thread axial length on the inner conductor situated to the right in the figure is about half as great as the axial length of the threaded sleeve 3. In assembly, the threaded sleeve 3 is screwed onto such long threading to its entirety, and, then, after axial alignment of the inner conductor 1 of cable 22 therewith, sleeve 3 is screwed over the threading inner conductor 1 of cable 22 far enough so that the threaded sleeve 3 preferably covers the respective end regions of both inner conductors 1 to about the same extent. For a better and more definite contacting, conductive silver, conductive lacquer, or the like, can be brushed, or otherwise applied, into the threads, or can be applied at the junction points between abutting connector ends for examples, to reduce and preferably avoid contact resistance caused as a result of oxidation.

In order to connect the outer conductors with each other, a supporting sleeve 4 is pushed into each cable 21 and 22 under the outer conductor 2 but over inner conductor 1, and hemi-cylindrical shell pair 5 is placed circumferentially about the corresponding thus internally supported outer conductors 2 of the coaxial cables 21 and 22. Shell pair 5 is then clamped in place about each conductor 2 preferably by clamping means, such as a pair of conventional-type hose clamps 6, one clamp 6 being radially disposed over each sleeve 4. The clamping pressure developed by clamps 6 is absorbed by the supporting sleeves 4 inside the outer conductors 2 about each cable 21 and 22. Here, as well, conductive silver, conductive lacquer, or the like, can be advantageously employed between contacting portions. Preferably, but optionally, at least one additional supporting disc 7 is positioned in the region of the shells 5 over the inner conductors 1.

The steel bands 26 and the paper bands 24 over the outer conductor 2 which terminate in regions 8 are preferably secured in position by a securing means, such as, for example, by means of an adhesive band member 27.

The particular type of threaded connection thus achieved for inner conductors 1 by means of the demountable threaded connection sleeve 3, and the type of clamping connection thus achieved for the outer conductors 2 by means of shells 5 which are clamped in place makes a coaxial cable splicing operation relatively simple and reliable. The electrical and mechanical results are in addition surprisingly good. The short constructional size and length of the splice is particularly advantageous. The cost of such a splice is relatively very small. In the production of such a splice, the threaded inner conductors 1 can be easily, and conveniently axially aligned with one another and then connected, even in very small working spaces, without having to deflect conductor ends, such as would, for instance, be necessary if one were to use connection sleeves with opposing threading at opposed end regions thereof because, in that case, the inner conductor ends would first have to be brought to a front end spacing so that such connecting sleeve, having opposing threading, could be simultaneously screwed onto both opposed inner conductor ends.

Figure 2:
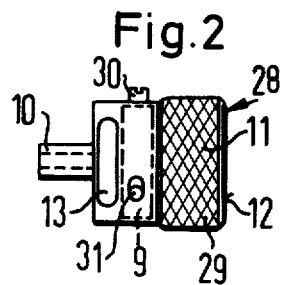
FIG. 2 is a side elevational view of a tool for thread forming on line ends of a coaxial cable being prepared for splicing in accord with the present invention.
Figure 2A:
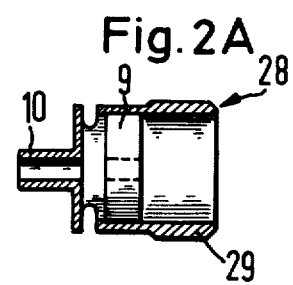
FIG. 2A is an axial longitudinal sectional view taken through the tool of FIG. 2.

In order to be able to easily and reliably carry out the assembly operations involved in making such a new splice, a thread cutting device 28, such as shown in FIGS. 2 and 2A is advantageously used. Device 28 employs a conventional type cutting die 9 and a guide bushing 10 for guiding the cutting die 9 over an inner conductor 1. Guide bushing 10 is integrally formed with a cylindrical housing 29. Housing 29 is provided on circumferential outer wall portions 11 thereof with knurled surfaces for finger gripping. The end of housing 29 opposed to that associated with bushing 10 is open so that chips (not shown) which are formed during a thread coating operation can fall out. Dye 9 is mounted inside housing 29 by any preferred means such as by a combination of set screw 30 and pin 31 which extend radially through housing 29. In housing 29 between dye 9 and bushing 10 a chamber is provided for catching chips formed during a thread coating operation, and an opening 13 is provided through which chips which collect can escape. Device 28 can substantially prevent chips from getting between outer conductor 2 and inner connector 1 during a thread coating operation.

Figure 3:
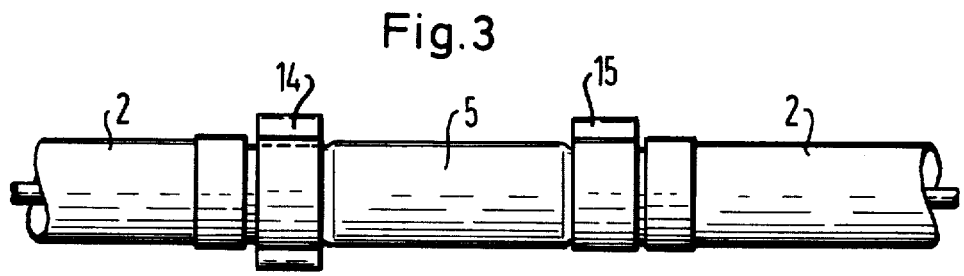
FIG. 3 is a view similar to FIG. 1 but showing an alternative embodiment.
Figure 4:
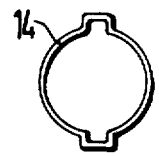
FIG. 4 is an end elevational view of one form of pinch connector used in the embodiment of FIG. 3.
Figure 5:
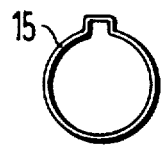
FIG. 5 is a view similar to FIG. 4 but showing another form of pinch connector used in the embodiment of FIG. 3.

In FIG. 3 a further sample embodiment for a coaxial connective structure is shown which is designated in its entirety by the numeral 32. Whereas in FIG. 1 the half shells 5 are depicted as partially broken away in order to make visible the threaded sleeve 3. In FIG. 3 the hemicylindrical shells 5 are depicted corresponding to their exterior view. The clamps 6 by means of which the shells 5 are pressed onto the outer conductors in structure 20 are also different in structure 32. Whereas the hose clamps 6 used in structure 20 have a screw tensioning, in structure 32 conventional pinch sleeves 14 and 15 are alternatively used, their form in the unpinched state being shown in FIGS. 4 and 5. FIG. 4 shows an embodiment form with two pinch projections, while FIG. 5 indicates one with only one pinch projection. By pinching these projections, the circumference of the sleeves 14 and 15 is decreased, so that the shells 5 encompassed by these sleeves 14 and 15 are pressed onto the outer conductors 2. In order to prevent the compression force applied against the outer conductors 2 from becoming excessive as a result of too severe a pinching, the pinching tools employed are arranged preferably in such a way that the action stroke thereof is limited to specified dimensions.

The known rules for avoiding intrinsic, surge impedance jumps can be applied in the arrangement when utilizing the present invention.

Other and further embodiments and variations of the present invention will become apparent to those skilled in the art from a reading of the present specification taken together with the drawings and no undue limitations are to be inferred or implied from the present disclosure.

We claim:

1. A connection structure for coaxial cable comprising (A) a pair of coaxial cable members, each said cable member having an outer conductor in radially spaced, circumferentially extending relationship to at least one inner conductor, said cable members being in axially aligned, adjacent relationship with one another, (B) an elongated connective sleeve member for said pair of inner conductors, said connective sleeve member having an internal diameter adapted to correspond to the outer diameter of said pair of inner conductors, said connective sleeve member being internally continuously threaded, (C) the terminal adjacent circumferentially outer surface portions of each one of said inner conductors having threads matable with said continuous internal threads of said connective sleeve member, with the threads on one said inner conductor extending an axial distance therealong at least about equal to the axial length of said connective sleeve member, (D) each one of said pair of inner conductors being threadably associated about equally with said associated sleeve member, thereby to provide electrical interconnection therebetween, (E) a pair of supporting sleeve members, each one of said supporting sleeve members having an outer circumferential surface whose diameter supports radially an inner adjacent surface of the terminal portion of a different one of said outer conductors, and further having an axial aperture therein larger in internal diameter than the outside diameter of said inner conductors, (F) a longitudinally mating, elongated pair of hemi-cylindrical shell members mounted circumferentially about circumferentially outer surface portions of adjacent terminal ends of each one of said pair of outer conductors, and (G) a pair of radially contractable contracted clamping means, each one thereof being mounted circumferentially about a different opposed end portion of said mounted pair of hemi-cylindrical shell members, each said clamping means being in radially adjacent, compressed relationship to a different one of said supporting sleeve members.

2. The connection structure of claim 1 further having securing means holding end portions of protective overlayments of said outer conductors thereto.

3. The connection structure of claim 1 further having at least one supporting disc means positioned in said shell members, such supporting disc means having an axially extending aperture therethrough for passage therethrough of said inner conductors.

4. The connection structure of claim 1 further having a conductive lacquer disposed at junction locations between said outer conductors and adjoining portions of said pair of hemi-cylindrical shell members.

5. The connection structure of claim 1 further having a conductive lacquer disposed at junction locations between each said inner conductor and its associated said connective sleeve member.

* * * * *